(12) United States Patent
Lee et al.

(10) Patent No.: US 6,351,341 B1
(45) Date of Patent: Feb. 26, 2002

(54) APPARATUS AND METHOD FOR PROVIDING AXIAL CONTROL OUTSIDE IMPACT RESISTANCE OF A HARD DISK DRIVE TO MAINTAIN A CONSTANT FLYING HEIGHT OF A HEAD BY CONTROL OF A SUSPENSION

(75) Inventors: Hae-Joong Lee; Myung-Chan Jeong, both of Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/364,972

(22) Filed: Dec. 28, 1994

(30) Foreign Application Priority Data

Dec. 31, 1993 (KR) .......................................... 93-31792

(51) Int. Cl.$^7$ ............................................ G11B 21/02
(52) U.S. Cl. ........................................................ 360/75
(58) Field of Search ................................ 360/75, 77.02, 360/103, 78.12, 70, 72.17, 105, 109, 107, 77.16; 318/649; 73/728, 9; 310/83, 800, 337; 226/190; 369/233, 53

(56) References Cited

U.S. PATENT DOCUMENTS

| 4,172,265 A | * | 10/1979 | Sakamoto et al. ............. 360/70 |
| 4,605,977 A | | 8/1986 | Matthews ..................... 360/103 |
| 4,651,242 A | | 3/1987 | Hirano et al. ................. 360/103 |
| 4,843,502 A | * | 6/1989 | Tagawa ........................ 360/105 |
| 4,950,936 A | * | 8/1990 | Rynne et al. ................. 310/337 |
| 5,270,891 A | * | 12/1993 | Rijckaert et al. ......... 360/109 X |
| 5,299,082 A | * | 3/1994 | Ananth et al. ............... 360/106 |
| 5,313,445 A | | 5/1994 | Wada et al. .................... 369/53 |
| 5,377,058 A | * | 12/1994 | Good et al. .............. 360/109 X |
| 5,404,252 A | * | 4/1995 | Nagasawa et al. ........ 360/77.16 |
| 5,408,376 A | * | 4/1995 | Nishikura et al. ........... 360/109 |
| 5,438,469 A | * | 8/1995 | Rudi ........................... 360/109 |

FOREIGN PATENT DOCUMENTS

| JP | 1-1311481 | 12/1989 |
| JP | 3-113879 | 5/1991 |
| JP | 4-129072 | 4/1992 |
| JP | 5-47020 | 2/1993 |

* cited by examiner

Primary Examiner—David Hudspeth
Assistant Examiner—K. Wong
(74) Attorney, Agent, or Firm—Robert E. Bushnell, Esq.

(57) ABSTRACT

The present invention relates to an apparatus for an axial control and outside impact resistance of a hard disk drive (HDD), and more particularly to an impact resistant apparatus and its method by way of an axial control of a hard disk drive continuously maintaining a head at a constant flying height under an unsteady state by way of the control of an active element after equipping a head suspension with the active element for the stabilization of signals read/written on a disk. In the method to control the location of the constant flying height of the head by way of the control of suspension of the hard disk drive, this invention for the performance of the purposes is comprised of the steps of sensing the tensile or the compressive state due to the bend of suspension following the increase of the flying height of the head by the active damper, providing the value for the increase of a reverse tensile strength for the active damper in order to return to the normal flying height when the head is higher than the normal flying height after the suspension becomes tensed in the sensing step, and providing the value for the increase of the reverse compressive strength for the active damper in order to return to the normal flying height when the head is lower than the normal flying height after the suspension is compressed due to the flying height decrease of the head in the sensing step.

21 Claims, 5 Drawing Sheets

DISK ROTATION DIRECTION

APPARATUS AND METHOD FOR PROVIDING AXIAL CONTROL OUTSIDE IMPACT RESISTANCE OF A HARD DISK DRIVE TO MAINTAIN A CONSTANT FLYING HEIGHT OF A HEAD BY CONTROL OF A SUSPENSION

CROSS-REFERENCE TO RELATED APPLICATIONS

This application makes reference to, incorporates herein and claims all benefits accruing from our application earlier filed in the Korean Industrial Property Office Dec. 31, 1993 of our application entitled OUTSIDE IMPACT RESISTANT APPARATUS AND METHOD BY AXIAL CONTROL OF HARD DISK DRIVE, which application was assigned Ser. No. 31792/1993.

BACKGROUND OF THE INVENTION

The present invention relates to an apparatus providing axial control and outside impact resistance for a hard disk drive (HDD), and more particularly to an impact resistant apparatus and a method of axial control of a hard disk drive for continuously maintaining a magnetic head at a constant flying height (CFH) over a disk in an unsteady state. The method controls an active element equipped on a head suspension to achieve stabilization of signals read and written on the disk.

Recent trends in hard disk drive technology have created incentives to produce disk drive devices that are more light-weight and have a higher storage capacity. Accordingly, the track pitch and bit cell of contemporary hard disks have become minute. As a result, technologies have been devised wherein servo-mechanisms are carefully controlled to enable high precision read and write operations. These technologies basically require that the magnetic head of an actuator be maintained at a constant flying height above a top side of the disk (typically, less than 0.8 micrometers).

It is essential that the head be maintained at this requisite flying height above the disk in order to stabilize the electrical signals generated during reading and writing operations. The stabilization of these signals during the reading and writing operations is attained when the servo-mechanism is controlled with high precision.

A conventional device for maintaining a constant flying height of the head is disclosed in U.S. Pat. No. 5,012,369 entitled Head Suspension Mechanism Of A Recording Apparatus With A Constant Flying Height issued to Owe et al. on Apr. 30, 1991. In this invention, a load is beam is engaged by a pressing member to control the flying height of the head. The force of the pressing member is adjusted by a screw to maintain a constant flying height. While this invention purports to control flying height of the head, it contains no provision for the problem associated with the head contacting the surface of the disk.

In U.S. Pat. No. 5,115,664 entitled Tunable Feedback Transducer For Transient Friction Measurement issued to Hegde et al. on May 26, 1992, another conventional system for maintaining a fixed distance between system members is disclosed. In Hegde et al. '664, an output is taken from a servomechanism to provide a signal proportional to a force exerted on a movable system member due to friction. While this invention may possess merit in its own right, it suffers from a problem in that the magnetic head is not prevented from contacting the disk. Accordingly, this system risks data destruction due to this contact and we therefore believe that an improved device can be constructed.

SUMMARY OF THE INVENTION

Therefore, it is an object of the present invention to provide an improved hard disk drive and control method therefor.

It is another object to provide a method and apparatus which can ensure the stabilization of electrical signals during reading and writing operations by continuously maintaining a desired constant flying height of a head.

It is still another object to provide a method and apparatus which can ensure the stabilization of electrical signals during reading and writing operations in both steady and unsteady operational states of a hard disk drive.

It is yet another object to provide a method and apparatus which can ensure the stabilization of electrical signals during reading and writing operations by installing an active element at a suspension of the hard disk drive to control axial bead displacement of a spindle motor.

It is still yet another object to provide an apparatus for improving access time of a hard disk drive by stabilizing an initial settlement of a head by using an active damper.

It is also an object to provide an apparatus which moves a head to a safety area of a disk during a reading and writing operation when an outside impact exceeds a specified margin, and then returns the head to its prior track position.

These and other objects can be accomplished according to the principles of the present invention by: sensing tensive and compressive states of a suspension attributable to increases and decreases in flying heights of a head, providing to an active damper a value indicative of a reverse tensive force necessary to return the head to a normal flying height when the head is determined to be higher than the normal flying height in the sensing step, and providing to the active damper a value indicative of a reverse compressive force necessary to return the head to the normal flying height when the head is determined to be lower than the normal flying height in the sensing step.

Accordingly, in the sensing step, the tensive or compressive state due to a bend in the suspension following the flying height increase or decrease is sensed by the active damper.

The values indicative of the reverse tensive or compressive forces are provided to the active damper as a control signal to enable the active damper to adjust to the tensive or compressive forces in order to maintain constant flying height.

Moreover, the hard disk drive of the present invention resists impacts by: sensing an outside impact of the hard disk, determining whether a value indicative of the sensed impact is less than a standard marginal impact value, transferring the head to a safety area on the disk where no data exists when the sensed impact value is greater than the standard marginal impact value, confirming a constant flying height of the head, and returning the head to the track position occupied prior to transfer after a constant flying height of the head is confirmed. Accordingly, the head can be replaced to the track position previously occupied after the flying height is confirmed as steady and constant.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
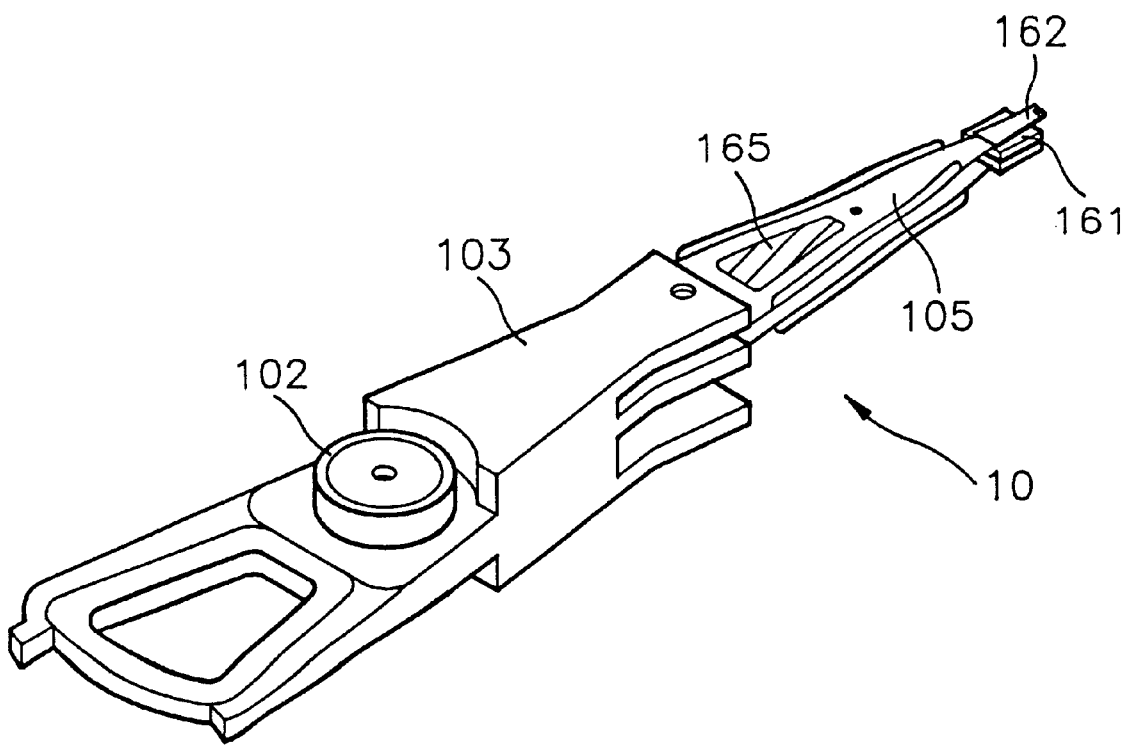
FIG. 1 is a schematic perspective view showing a configuration of head suspension (105) with swing arm (103) and active element (165).
Figure 2:
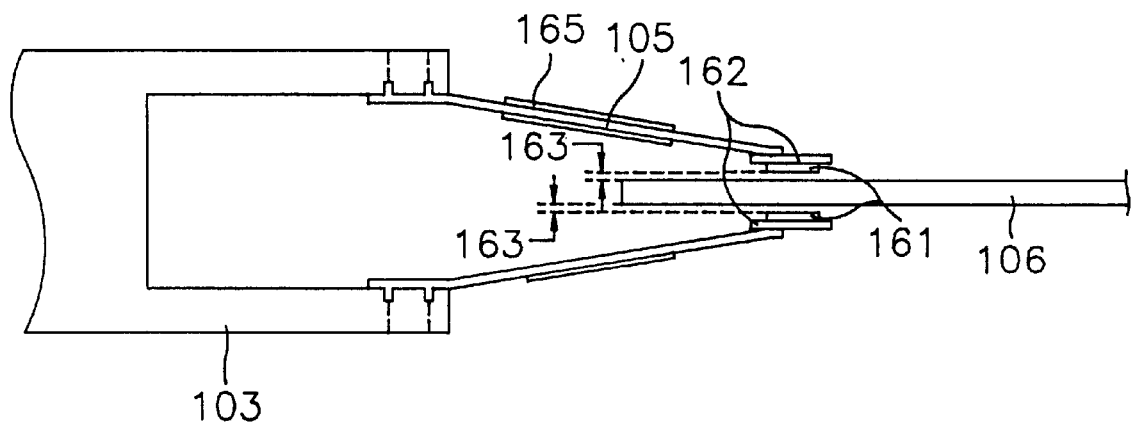
FIG. 2 is a schematic plan view of the configuration of FIG. 1 wherein two heads are employed.
Figure 3:
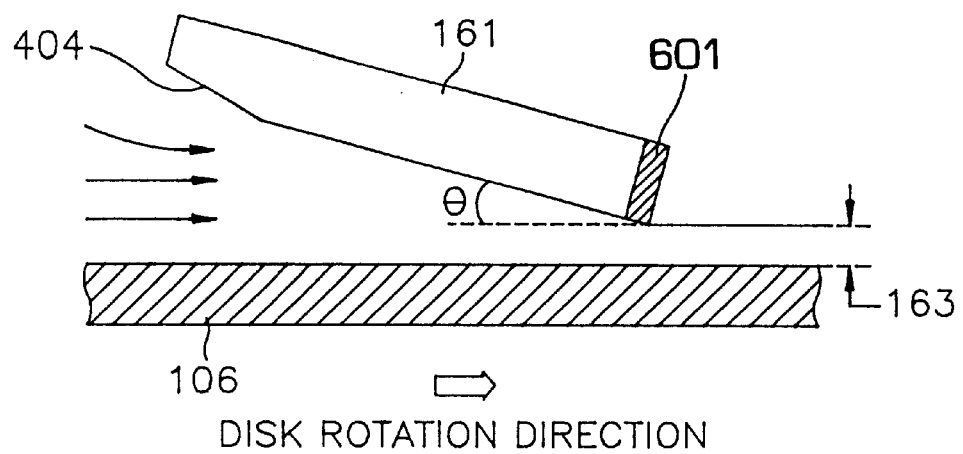
FIG. 3 is a schematic plan view illustrating the constant flying height (CFH) of head (161) above disk (106) of FIG. 2.
Figure 4:
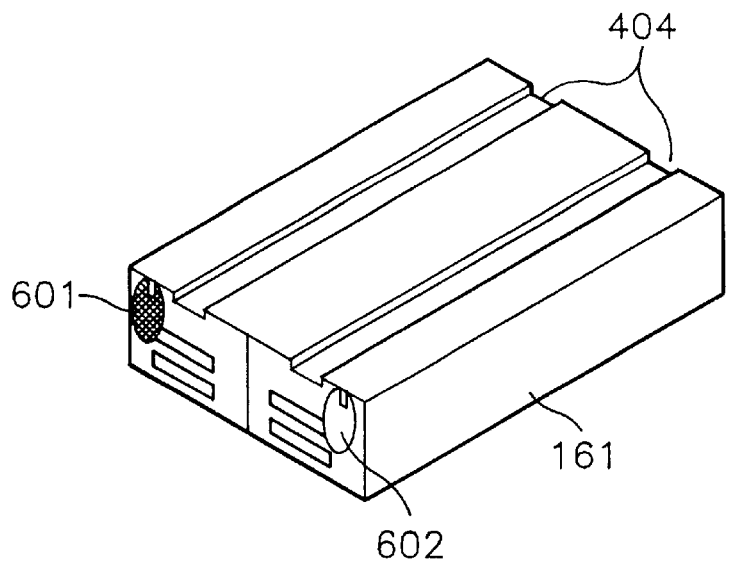
FIG. 4 is a schematic perspective view of head (161) of FIG. 3.

Referring to FIGS. 1 through 4, a head 161, such as the one illustrated in FIG. 4, is attached to gimbals 162 at the end of a suspension 105 of a swing arm 103 as illustrated in FIG. 1. Swing arm 103 rotates about a pivot bearing axis 102 to access disk 106 by controlling electrical current provided to a voice coil motor (VCM). Once rotated to a desired position on disk 106, head 161 is able to read or write data, as illustrated in FIG. 3. For stabilization of the reading and writing operations, head 161 should maintain a constant flying height 163 above the surface of disk 106, as illustrated in FIG. 3.

Head 161, to which transducers 601 and 602 are attached and used to read and write data on disk 106, as illustrated in FIG. 4, and the main body to which head 161 is attached can also be referred to as a head slider. Accordingly, head 161 can be referred to as a head slider depending upon the case.

As shown in FIG. 2, head 161 is attached to one end of a plate spring (hereinafter referred to as "suspension") composed of a stainless steel material by gimbals 162. Suspension 105 is attached to swing arm 103.

In FIG. 2, head 161 is attached to swing arm 103 by gimbals 162 through suspension 105 on both the upper and lower sides of disk 106. When the hard disk drive is not operating, head 161 remains in a safety area on the surface of disk 106 where no data exists. When the hard disk drive is operating, head 161 moves to the constant flying height 163 above disk 106 by an air current created between head 161 and disk 106 when disk 106 is rotated by a spindle motor. The combined configuration of head 161 and suspension 105 can be referred to as the head gimbals assembly (HGA).

Each head 161, as illustrated in the FIG. 2, is attached to suspension 105 through gimbals 162 which are composed of ultra-thin plate springs. The position of head 161 attached to gimbals 162 is maintained according to a predetermined slope ($\Theta$), as illustrated in FIG. 3.

Transducer 601 of FIGS. 3 and 4, which is located at a trailing edge of head 161, reads and writes electrical signals on the surface of disk 106. The flying height 163 of head 161 refers to the gap between the trailing edge of head 161 and the surface of disk 106, as illustrated in FIG. 3.

The flying of head 161 above disk 106 is enabled by air pressure formed between the surface of disk 106 and the surface of head 161 when disk 106 rotates.

The surface of head 161 proximal to disk 106 is referred to as an air bearing surface (ABS). A taper 404 formed on the air bearing surface (ABS) at a portion where air flow enters (see arrows in FIG. 3) enables head 161 to receive a lifting force which maintains its position over disk 106.

FIG. 4 shows the air bearing surface (ABS) of a flat taper type of head 161 and a thin film inductive type of transducer 601. One of the two transducers 601 and 602 is not used.

It is possible to maintain the desired constant flying height during steady state motion of the hard disk drive due to the change in shape of head 161, but it becomes impossible to maintain the desired constant flying height during an unsteady state of motion.

The reason it is impossible to maintain the desired constant flying height under the unsteady state is because there is no way to compensate for problems such as: the change in flying height resulting from twisting transformations in the resonant frequency of suspension 105, the change in flying height resulting from an axial non-repeatable runout (NRRO) of the spindle motor (i.e. a non-periodical displacement phenomenon that occurs when a disk rotates about its axis), and collisions between surfaces of disk 106 and head 161 resulting from the impact of the hard disk drive. Compensation for the dynamic axial disturbance of the spindle motor (i.e. the axial displacement of the spindle motor) requires an effective way to control the flying height of head 161.

Figure 5:
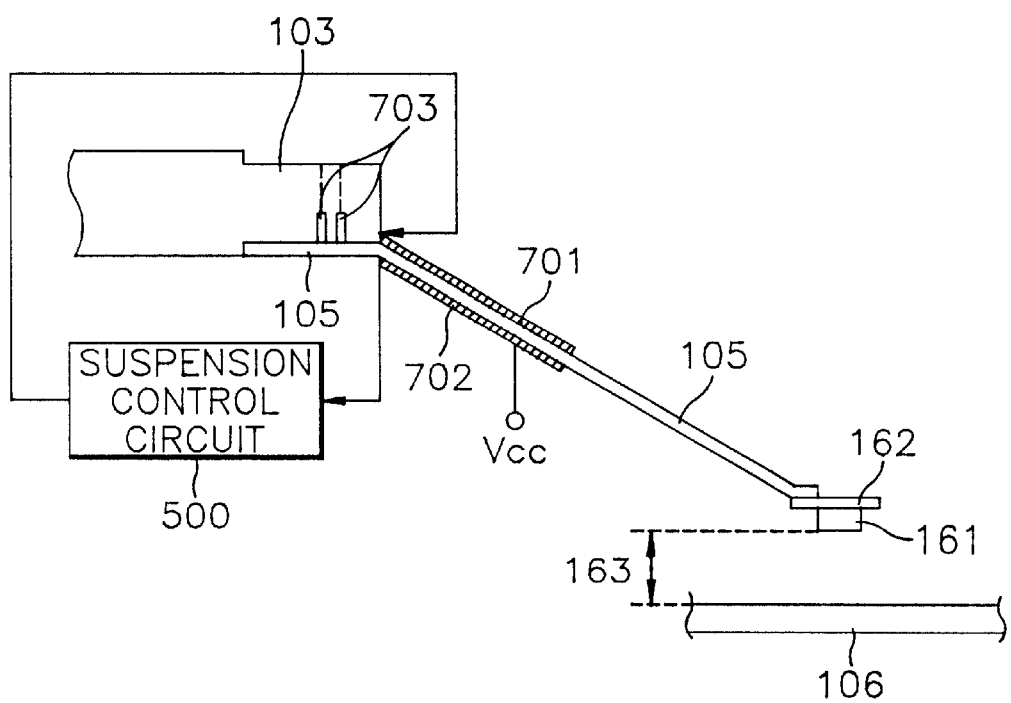
FIG. 5 is a block diagram illustrating the control of head suspension (105) according to the principles of the present invention.

FIG. 5 is a block diagram illustrating the control of head suspension 105 according to the principles of the present invention.

Referring to FIG. 5, displacements (i.e. tension and compression) of suspension 105 corresponding to flying height changes of head 161 are detected and compensated for by attaching a first actuator 701 composed of a piezoelectric ceramic and a second actuator composed of a piezoelectric polymer to an upper part of suspension 105. Second actuator 702 detects changes in the tension and compression of suspension 105 caused by changes in the flying height of head 161, and provides an output representative of such tension and compression changes to a suspension control circuit 500. Suspension control circuit 500 generates a compensation value and applies this value to first actuator 701, so that appropriate adjustments can be made to maintain a desired constant flying height.

Second actuator 702, which acts as a "strain gauge", detects the state of suspension 105 by detecting changes in the flow of electrical current generated by a voltage Vcc provided to second actuator 702. That is, changes in the tension and compression of suspension 105 produces corresponding changes in the electrical resistance of second actuator 702. Accordingly, changes in the flow of electrical current in second actuator 702 reflect the tension and compression of suspension 105.

In order to maintain the desired constant flying height, first and second actuators 701 and 702, which are active elements for sensing and controlling axial head displacement of the spindle motor, should have the following characteristics:

First, they should be able to respond rapidly to dynamic disturbances. Secondly, the maximum control displacement should be 1 micrometer (axially) or less. Thirdly, the minimum control displacement should be at least 0.1 micrometers (axially). And fourthly, they should be made of a light-weight material to avoid adversely influencing voice coil motor (VCM) inertia.

First and second actuators 701 and 702 should be installed on the upper end of suspension 105. Also, they should be very flexible in the axial direction of the spindle motor and located as close to head 161 as possible.

The configuration of first and second actuators 701 and 702 attached to suspension 105 serves as a sensing device to detect minute tension and compression changes in suspension 105 indicative of changes in the flying height of head 161.

Figure 6:
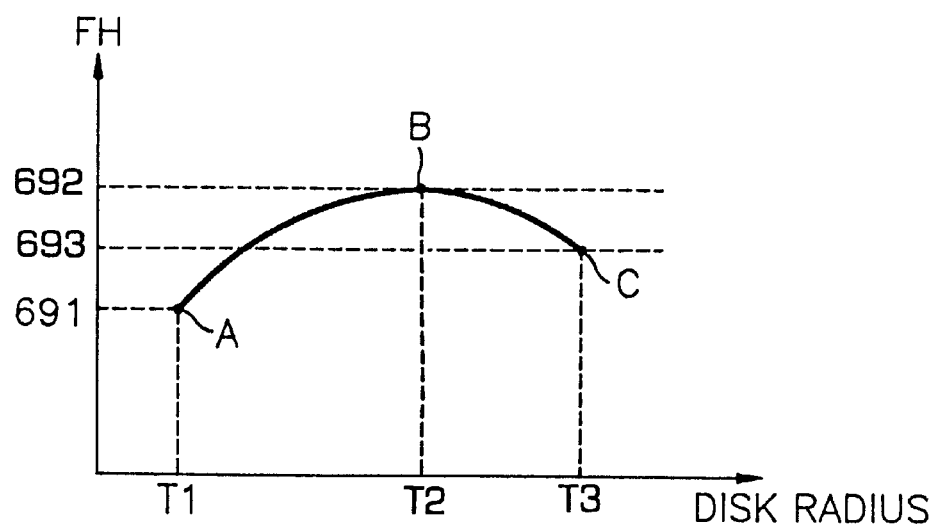
FIG. 6 is a curve diagram illustrating flying height changes when using a rotary-type voice coil motor (VCM).

FIG. 6 is a curve diagram illustrating flying height changes in head 161 when using a rotary-type voice coil motor (VCM). The horizontal axis represents the radius of the disk and the vertical axis represents flying height of head 161. Point A represents an initial state of head 161; that is, head 161 is at a flying height indicated by reference numeral 691 when at radial position T1 of disk 106. Point B represents the maximum flying height of head 161 caused by air pressure formed between the surface of disk 106 and the surface of head 161 when disk 106 rotates. This maximum flying height, which is indicated by reference numeral 692, occurs when head 161 is at radial position T2 of disk 106. Point C represents flying height of head 161 when at radial position T3 (i.e. the outermost track) of disk 106.

Figure 7:
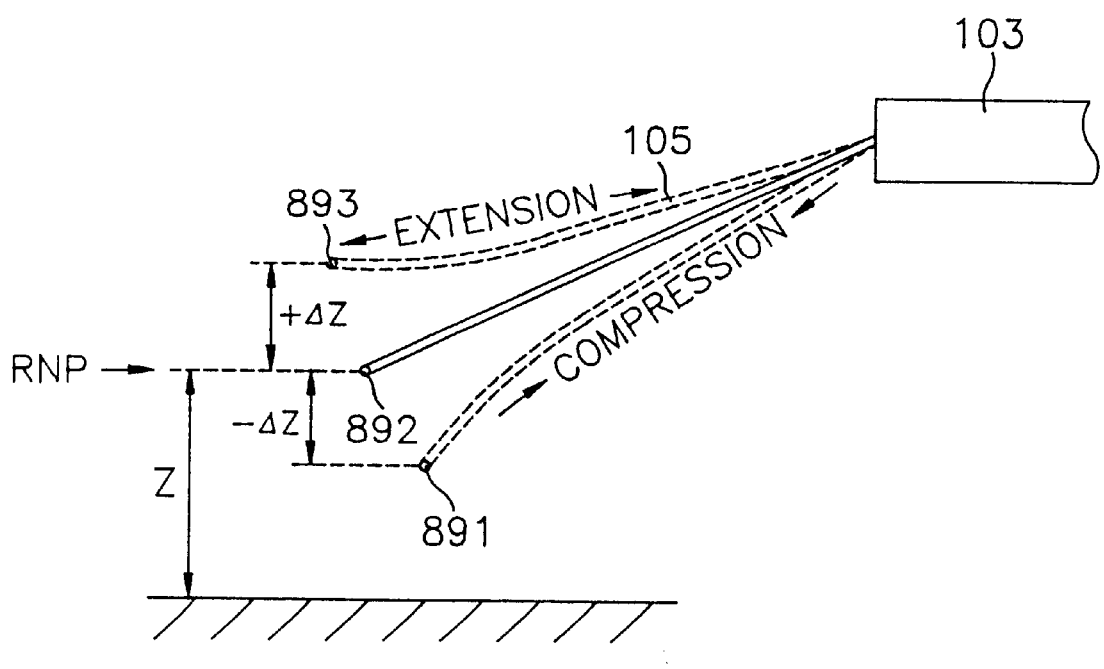
FIG. 7 is a schematic plan view illustrating a return to reference null position (RNP) in accordance with the tension/compression of suspension (105).

FIG. 7 illustrates the state of suspension 105 and flying height changes corresponding to the tension and compression of first actuator 701 attached to the upper end of suspension 105.

Figure 8:
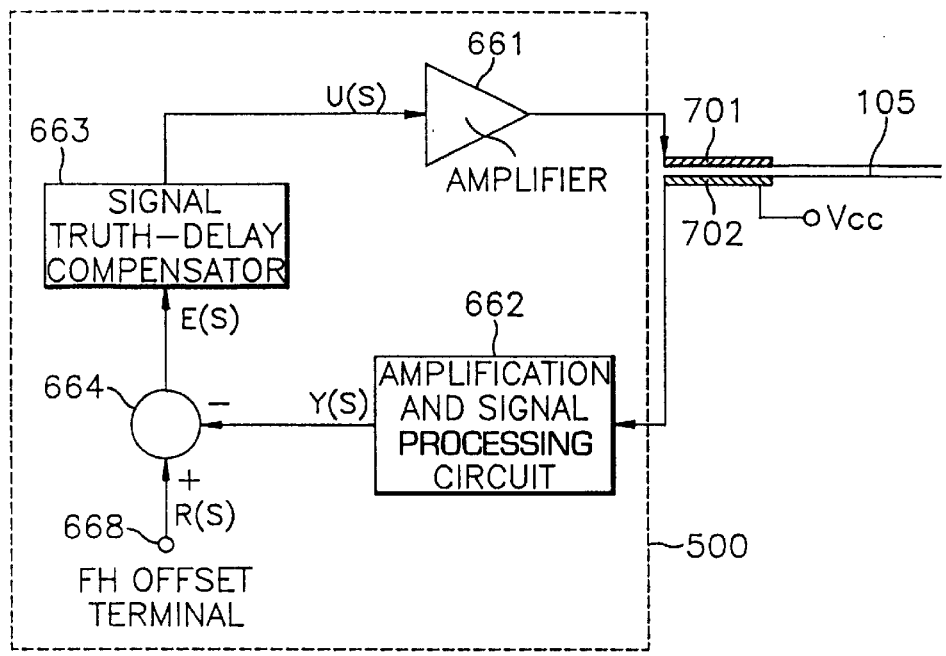
FIG. 8 is a circuit diagram illustrating suspension control circuit (500) of FIG. 5

FIG. 8 is a detailed circuit of suspension control circuit 500 of suspension 105 constructed in accordance with the principles of the present invention. Suspension control circuit 500 is comprised of an amplification and signal processing circuit 662 for outputting a signal Y(S) representative of a change detected in the tension or compression of suspension 105 by second actuator 702, an error value extraction device 664 for extracting an error value E(S) after comparing a current flying height offset value R(S) input to a flying height FH offset terminal 668 with a value represented by the signal Y(S) output from amplification and signal processing circuit 662, a signal truth-delay compensator 663 for compensating for the phase delay of the signal E(S) output from error value extraction device 664, and an amplifier 661 for amplifying a signal U(S) output from signal truth-delay compensator 663 to provide an amplified output to first actuator 701.

Figure 9:
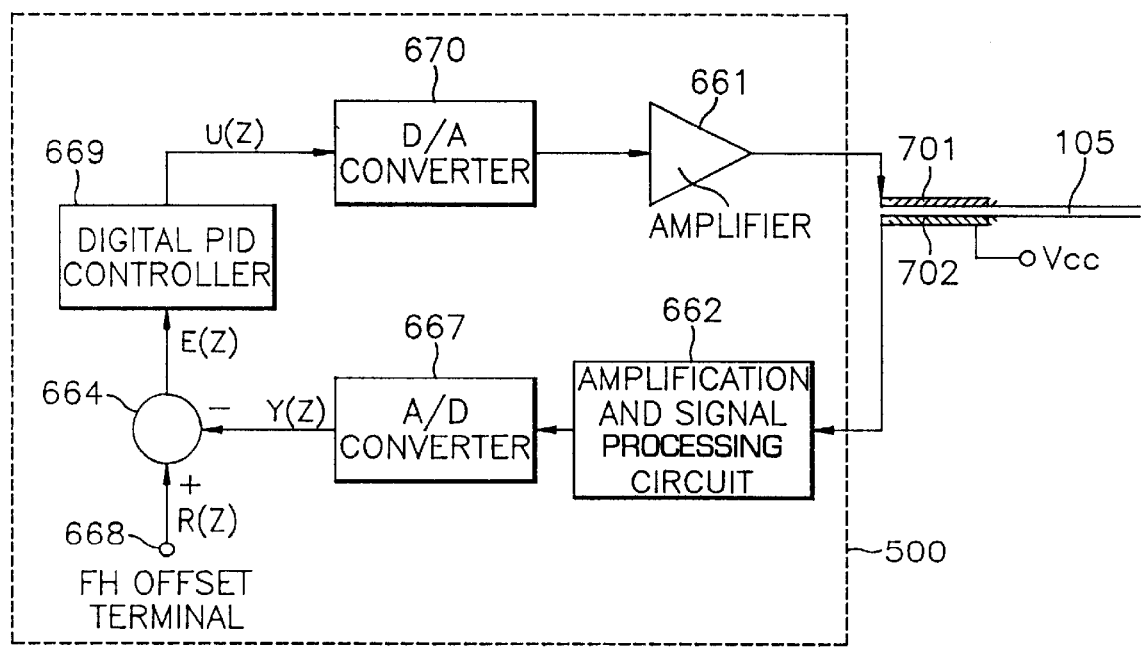
FIG. 9 is a circuit illustrating another embodiment of suspension control circuit (500) of FIG. 5.

FIG. 9 is a diagram illustrating a second embodiment of suspension control circuit 500 constructed according to the principles of the present invention. While the circuit of FIG. 8 utilizes an analog method, the circuit of FIG. 9 uses a digital method. Suspension control circuit 500 of FIG. 9 is comprised of an analog-to-digital (A/D) converter 667 for analog-to-digitally converting the output of amplification and signal processing circuit 662, error value extraction device 664 for extracting error value E(Z) after comparing the flying height offset value R(Z) input to flying height FH offset terminal 668 with the value represented by signal Y(Z) output from A/D converter 667, a digital proportional-integral-derivative (PID) type controller 669 for receiving and digitally controlling the signal E(Z) output from error value extraction device 664 and generating an adjustment signal U(Z) after summing the received signal according to a constant ratio following the differentiation and integration, and a digital-to-analog (D/A) converter 668 for converting the output of digital PID controller 669 to provide a converted analog signal to amplifier 661.

The piezoelectric ceramic and piezoelectric polymer used as first and second actuators 701 and 702, respectively, are extended due to piezoelectric characteristics when an electric field is applied. This principle is described on page 196 of "*Examples and Basis of Application Laser Guide*" published by the domestic Electric and Electronic Research Institute on Sep. 5, 1985.

Referring now to FIGS. 1 through 9, the preferred embodiments of the present invention will hereinafter be described.

In FIG. 7, no displacement change is detected in accordance with the sensing value detected by first and second actuators 701 and 702 of suspension 105 when normal flying height 892 of head 161 is maintained. When the flying height of head 161 increases by an amount equal to +ΔZ as depicted by reference numeral 893, however, the resulting tension is detected at a lower portion of suspension 105. That is, second actuator 702 detects the tension due to the distortion (i.e. bending) of suspension 105 since the piezoelectric polymer acts as a "strain gauge", as described earlier. A tension detection value is input to suspension control circuit 500 of FIG. 8 or 9 which performs an adjustment operation. That is, a reverse tensive force corresponding to the tensive force detected at suspension 105 can be generated from the flying height offset value input to flying height FH offset terminal 668.

Control of the reverse tensive force of suspension 105 is performed by suspension control circuit 500 as follows. First, a signal representative of the tensive force detected at second actuator 702 is amplified through amplification and signal processing circuit 662. Output signal Y(S) from amplification and signal processing circuit 662 is then combined with flying height offset value R(S) from flying height FH offset terminal 668 at error value extraction device 664 and error value E(S) is determined by a subtraction operation. Compensation for the phase delay of E(S) is provided for by signal delay-truth compensator 663. The output U(S) of signal delay-truth compensator 663 is amplified by amplifier 661 and then provided to first actuator 701 composed of the piezoelectric ceramic. In response to receipt of the amplified signal, first actuator 701 generates the reverse tensive force necessary to return suspension 105 (and head 161) to the reference null position (RNP), as illustrated in FIG. 7. Similarly, when the flying height of head 161 decreases by an amount equal to −ΔZ, as depicted by reference numeral 891 in FIG. 7, the sensing part of second actuator 702 generates a value representative of detected compressive force. If this value is input to suspension control circuit 500, the reverse compressive force is generated and applied to first actuator 701, according to the process described above, in order to return suspension 105 to reference null position (RNP) 892.

FH changes attributable to the tension and compression of suspension 105 in cases where a rotary-type voice coil motor (VCM) is used are generally the same as the flying height changes in cases where a flat taper-type of head 161, as illustrated in FIG. 4, is used.

Referring to FIG. 6, flying height changes increase at the outer radial portions of disk 106 due to relative differences in the linear velocity of disk 106 on inner and outer tracks. These differences in disk velocity produce varying levels of air pressure between disk 106 and head 161, which in turn produce different degrees of force upon head 161. With a rotary-type of voice coil motor (VCM), a flying height change curve as shown in FIG. 6 results because a large skew angle attributable to changes in head angle exists between the center-line of head 161 and the normal line of the track. Accordingly, a decrease in flying height occurs on the outermost track of disk 106.

Magnitudes of read/write signals of transducer 601 in FIG. 4 are dependent upon changes in flying height. For example, when constant density reading is desired for design purposes, it is essential to maintain the constant flying height of head 161 over all data tracks. Maintaining head 161 at the constant flying height above the surface of disk 106 in this manner requires a series of developments changing the air bearing surface of head 161, i.e. TPC (Transverse Pressure Contours), TAB (Tri-rail Air Bearing) and NPAB (Negative Pressure Air Bearing).

Accordingly, it is possible to use the flat taper-type of head 161 for normal operation in the present invention, even without using a head slider which takes advantage of the specific air bearing surface and maintains the constant flying height over the entire data track section, which is a requirement of the constant density reading design.

Continuous maintenance of a desired flying height becomes enabled by using suspension control circuit 500 to actively compensate for dynamic disturbances inside and outside the hard disk drive. Suspension control circuit 500 detects and compensates for the tension or compression of suspension 105 by using first and second actuators 701 and 702 installed at suspension 105, even during abnormal operating states of the hard disk drive, such as the following situations A–C:

A. Flying height changes due to resonance in the self-resonant frequency of the HGA suspension.
B. Flying height changes due to the axial NRRO of the spindle motor.
C. Flying height changes due to outside impact of the hard disk drive.

The piezoelectric polymer sensor of second actuator 702 also plays a role in data protection by preventing the collision of head 161 and disk 106 due to an outside impact. This helps strengthen the impact resistance of the hard disk drive which is especially important in view of the trend of hard disk drive miniaturization. Head 161 moves to a safety area on disk 106 where no data exists when an impact beyond the marginal impact occurs. This is enabled by installing the sensor for detecting outside acceleration on the PCB to protect the data from impacts, for instance like, "Safe-Rite HDD" from the Seagate Co. of U.S.A. The piezoelectric polymer sensor of second actuator 702 can be used for the same purpose as mentioned above.

That is, when a flying height change of head 161 occurs due to an outside impact beyond the constant margin, the servo control of the present invention first moves head 161 performing the reading or writing into the safety area on the disk, and then when flying height is normal, head 161 returns to the track location it previously occupied.

Control of the voice coil motor (VCM) is divided into a seek mode and a track following mode, as is well-known in hard disk drive design. The seek mode represents a voice coil motor (VCM) control mode for transferring head 161 from a currently occupied track to a track at a target location. The track following mode represents a voice coil motor (VCM) control mode where head 161 performs the read/write function at the center of the track at the target location. There is also a settling characteristic associated with head 161, which serves as an important control function while the seek mode changes to the track following mode. The sooner head 161 settles, the faster reading and writing can be performed. Radial settling can be improved with voice coil motor (VCM) control, but axial settling can be improved only marginally with a passive damper attached to the upper portion of suspension 105. Access time of the hard disk drive, however, can be improved by stabilizing the initial settling of the track following mode as rapidly as possible with the active damper using the piezoelectric ceramic/polymer of first and second actuators 701 and 702.

Although not every practical illustration of the present invention has been described, it will be clear to those of ordinary skill in the art that equivalents can be substituted in the present invention without departing from the central scope thereof. Another great advantage of the present invention achieved by using the piezoelectric element on the suspension or flexible arm is to solve problems such as increases in frictional force and the wear which can occur due to the contact of head 161 and disk 106 while starting and stopping the hard disk drive by separating head 161 and disk 106 after applying the necessary power source to the actuator.

Moreover, the head of the hard disk drive is set to have a flying height that is constant and as low as possible depending upon upgrade capabilities and capacity. It is known in the present invention, that there are various methods to adjust the pressure distribution in accordance with the air currents between the air bearing surface (ABS) of head 161 and disk 106. There is, however, a problem in that the starting load of the spindle motor increases or data is lost as a result of an increase in friction due to wear because head 161 and disk 106 contact each other when the spindle motor fails to rotate at the designated constant velocity, for instance during the starting or stopping of the spindle motor.

The present invention, however, can solve the defects due to contact of head 161 and disk 106 by utilizing an actuator having a piezoelectric element. Head 161 and disk 106 are placed in close proximity from the beginning of disk rotation until its rotation at a constant velocity and from the time of rotation at the constant velocity until the time immediately after rotation is stopped. Head 161 and disk 106 are separated from each other immediately after application of the power source so that the compressive strength can be generated and applied to the actuator attached to the upper portion of suspension 105.

What is claimed is:

1. A method of providing axial control and outside impact resistance for a hard disk drive to maintain a normal flying height of a head by controlling a suspension of said hard disk drive, said method comprising the steps of:

sensing one of a tensive state and a compressive state of said suspension, said tensive state of said suspension indicating that a flying height of said head is greater than said normal flying height, said compressive state of said suspension indicating that said flying height of said head is less than said normal flying height;

generating a value indicative of an increase in reverse tensive force necessary for application to said suspension to return said head to said normal flying height when said tensive state of said suspension is sensed in said sensing step; and generating a value indicative of an increase in reverse compressive force necessary for application to said suspension to return said head to said normal flying height when said compressive state of said suspension is sensed in said sensing step.

2. The method as claimed in claim 1, wherein said sensing step further comprises determining said flying height of said head by measuring an electrical current flowing through said suspension.

3. A method of providing axial control and outside impact resistance for a hard disk drive to maintain a normal flying height of a head by controlling a suspension of said hard disk drive, said method comprising the steps of:

sensing one of a tensive state and a compressive state of said suspension, said tensive and compressive states indicative of a bend in said suspension;

amplifying a first electrical signal indicative of one of a tension value and a compression value of said suspension in dependence upon said sensing step;

comparing said first electrical signal with a second electrical signal representative of a flying height offset value to generate a third electrical signal indicative of an error value, said error value being representative of a difference between said normal flying height and an actual flying height of said head;

compensating for a phase delay in said third electrical signal to generate a fourth electrical signal having a corrected phase and being indicative of said error value; and amplifying said fourth electrical signal and applying said fourth electrical signal after amplification to said suspension to return said head to said normal flying height.

4. The method as claimed in claim 3, wherein said sensing step further comprises determining said flying height of said head by measuring an electrical current flowing through said suspension.

5. A method of providing axial control and outside impact resistance for a hard disk drive to maintain a normal flying height of a head by controlling a suspension of said hard disk drive, said method comprising the steps of:

sensing one of a tensive state and a compressive state of said suspension, said tensive and compressive states indicative of a bend in said suspension;

amplifying a first electrical signal indicative of one of a tension value and a compression value of said suspension in dependence upon said sensing step;

digitalizing said first electrical signal after amplifying said first electrical signal to generate a second electrical signal having a digital format;

calculating an error value by determining a difference between a flying height offset value and said one of said tension and compression values, proportionally-integrating said error value to generate an integrated value, and combining at a constant ratio said integrated value to generate a third electrical signal having said digital format;

converting said third electrical signal to a fourth electrical signal having an analog format and then amplifying said fourth electrical signal; and providing said fourth electrical signal indicative of one of said tension and compression values for said suspension in order to return said head to said normal flying height.

6. The method as claimed in claim 5, wherein said sensing step further comprises determining said flying height of said head by measuring an electrical current flowing through said suspension.

7. An apparatus for providing axial control and outside impact resistance of a hard disk drive to maintain a constant flying height of a head by control of a suspension of said hard disk drive, said apparatus comprising:

a first actuator for sensing one of a tension value and a compression value attributable to a bend in said suspension;

an amplification and signal processing circuit for amplifying and outputting a first signal representative of one of said tension value and said compression value;

error value extraction means for extracting an error value by comparing a second signal representative of a current flying height offset value with said first signal output from said amplification and signal processing circuit to generate a third signal;

a signal compensator for compensating for a phase delay of said third signal output from said error value extraction means to generate a fourth signal; and an amplifier for amplifying said fourth signal and providing an amplified output to a second actuator to maintain said constant flying height of said head.

8. The apparatus as claimed in claim 7, wherein said first actuator is comprised of a piezoelectric polymer sensor attached to an upper end of said suspension for sensing said compression value following a decrease in flying height of said head.

9. The apparatus as claimed in claim 7, wherein said first actuator is comprised of a piezoelectric polymer sensor attached to an upper end of said suspension for sensing said tension value following an increase in flying height of said head.

10. The apparatus as claimed in claim 7, wherein said first and second actuators comprise active elements.

11. The apparatus as claimed in claim 10, wherein said active elements are flexibly attached to an upper end of said suspension.

12. The apparatus as claimed in claim 7, wherein said second actuator is comprised of a piezoelectric ceramic sensor.

13. An apparatus for providing axial control and outside impact resistance of a hard disk drive to maintain a head at a constant flying height over a disk by controlling a suspension of said hard disk drive, said apparatus comprising:

a first actuator for sensing one of a tension value and a compression value attributable to a bend in said suspension;

an amplification and signal processing circuit for amplifying and outputting a first signal representative of one of said tension value and said compression value;

an analog-to-digital converter for digitally converting said first signal output from said amplification and signal processing circuit to generate a second signal having a digital format;

error value extraction means for extracting an error value by comparing a third signal representative of a current flying height offset value with said second signal output from said analog-to-digital converter to generate a fourth signal;

a digital proportional-integral-derivative type controller for combining differentiation and integration values at a specified ratio to generate an adjustment signal;

a digital-to-analog converter for converting said adjustment signal into a fifth electrical signal having an analog format; and an amplifier for amplifying said fifth electrical signal and providing an amplified output to a second actuator to maintain said head at said constant flying height over said disk.

14. The apparatus as claimed in claim 13, wherein said first actuator is comprised of a piezoelectric polymer sensor attached to an upper end of said suspension for sensing said compression value following a decrease in flying height of said head.

15. The apparatus as claimed in claim 13, wherein said first actuator is comprised of a piezoelectric polymer sensor attached to an upper end of said suspension for sensing said tension value following an increase in flying height of said head.

16. The apparatus as claimed in claim 13, wherein said first and second actuators comprise active elements.

17. The apparatus as claimed in claim 13, wherein said active elements are flexibly attached to said an upper end of said suspension.

18. The apparatus as claimed in claim 13, wherein said head is a flat taper-type of head.

19. The apparatus as claimed in claim 13, wherein said second actuator is comprised of a piezoelectric ceramic sensor.

20. The method as set forth in claim 1, further comprising the steps of:

sensing application of an impacting force upon said hard disk drive while said head of said hard disk drive is in a first position over a disk, said step of sensing application of an impacting force comprising said steps of:
sensing one of said tensive state and said compressive state of said suspension;
generating said value indicative of said increase in reverse tensive force; and
generating said value indicative of said increase in reverse compressive force;

determining whether an output value indicative of said impacting force is beyond a standard marginal impact value;

moving said head to a second position representative of a safety area where no data has been written on said disk when said output value is beyond said standard marginal impact value;

confirming that said head is at a normal flying height above said disk after moving said head to said second position; and moving said head back to said first position after confirming that said head is at said normal flying height.

21. The method as set forth in claim 3, further comprising a step of digitalizing said first electrical signal after amplifying said first electrical signal to generate a second electrical signal having a digital format, said step of comparing comprises a step of calculating an error value by determining a difference between a flying height offset value and said one of said tension and compression values, proportionally-integrating said error value to generate an integrated value, and combining at a constant ratio said integrated value to generate a third electrical signal having said digital format, and said step of compensating for phase delay comprises a step of converting said third electrical signal to a fourth electrical signal having an analog format.

* * * * *